United States Patent
Hayashi et al.

(10) Patent No.: US 10,447,115 B2
(45) Date of Patent: Oct. 15, 2019

(54) ROTARY ELECTRIC MACHINE AND DRIVING SYSTEM

(71) Applicant: HONDA MOTOR CO., LTD., Tokyo (JP)

(72) Inventors: Nobuaki Hayashi, Saitama (JP); Manabu Yazaki, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 64 days.

(21) Appl. No.: 15/787,833

(22) Filed: Oct. 19, 2017

(65) Prior Publication Data

US 2018/0115220 A1 Apr. 26, 2018

(30) Foreign Application Priority Data

Oct. 21, 2016 (JP) .................................. 2016-207230

(51) Int. Cl.
*H02K 1/32* (2006.01)
*H02K 9/19* (2006.01)
*H02K 1/16* (2006.01)
*H02K 1/27* (2006.01)
*H02K 7/00* (2006.01)
*H02K 21/14* (2006.01)

(52) U.S. Cl.
CPC .............. *H02K 9/19* (2013.01); *H02K 1/16* (2013.01); *H02K 1/276* (2013.01); *H02K 1/32* (2013.01); *H02K 7/006* (2013.01); *H02K 21/14* (2013.01)

(58) Field of Classification Search
CPC .............. H02K 1/32; H02K 9/12; H02K 9/19
See application file for complete search history.

(56) References Cited

U.S. PATENT DOCUMENTS 8,928,195 B2 * 1/2015 Ohashi ...................... H02K 1/32
310/54
2007/0236094 A1 * 10/2007 Kaminski .............. H02K 1/278
310/156.28

(Continued)

FOREIGN PATENT DOCUMENTS

CN 102906969 A 1/2013
JP 5369634 B2 12/2013

OTHER PUBLICATIONS

Mar. 26, 2019, Chinese Office Action issued for related CN Application No. 201710962863.0.

*Primary Examiner* — Dang D Le
(74) *Attorney, Agent, or Firm* — Paratus Law Group, PLLC (57) ABSTRACT

A rotary electric machine includes a rotor, stator and a motor case. The rotor includes a rotor core, plural magnets disposed in the rotor core, and an end face plate disposed such that an inside surface thereof is in contact with an end face of the rotor core. The stator includes a stator core and a coil. The stator is disposed on an outer peripheral side of the rotor to face the rotor. The motor case accommodates the rotor and the stator and has a storage portion for storing liquid therein. A lower part of the rotor is immersed in the storage portion, and the motor case has an inclined wall extending from an upper side toward the permanent magnet or a peripheral part of the permanent magnet and guiding liquid scraped upward by the rotor to the magnet or the peripheral part of the magnet.

11 Claims, 9 Drawing Sheets

(56) References Cited

U.S. PATENT DOCUMENTS

| | | | |
|---|---|---|---|
| 2011/0148229 A1* | 6/2011 | Esse | H02K 9/19 |
| | | | 310/54 |
| 2013/0038151 A1 | 2/2013 | Ohashi et al. | |
| 2013/0270931 A1 | 10/2013 | Handa et al. | |
| 2013/0278091 A1 | 10/2013 | Ohashi et al. | |
| 2014/0175917 A1* | 6/2014 | Dedrich | H02K 9/19 |
| | | | 310/54 |

\* cited by examiner

ROTARY ELECTRIC MACHINE AND DRIVING SYSTEM

CROSS-REFERENCE TO RELATED APPLICATION

This application claims priority from Japanese Patent Application No. 2016-207230 filed on Oct. 21, 2016, the entire contents of which are incorporated herein by reference.

TECHNICAL FIELD

The present invention relates to a rotary electric machine and a driving system that can be mounted on vehicles.

BACKGROUND ART

In recent years, since there is a problem that a temperature rise of a permanent magnet in a hybrid vehicle or an EV vehicle using a rotary electric machine as a driving source, resulting in greatly affecting performance of the rotary electric machine, a technique for efficiently cooling the permanent magnet has been proposed.

In a driving system disclosed in patent literature 1, a refrigerant scraped upward by a gear, the refrigerant is supplied from the catch tank to a permanent magnet and a coil through a refrigerant passage formed inside an end face plate. Further, when the refrigerant is supplied to the refrigerant passage formed inside the end face plate, the refrigerant is supplied to a supply port of the end face plate from a cutout portion which is formed in a flange portion of a rotor shaft supporting the end face plate.

RELATED ART LITERATURE

Patent Literature

Patent Literature 1: JP-B-5369634

SUMMARY OF THE INVENTION

Problem that the Invention is to Solve

In the configuration disclosed in patent literature 1, however, the rotor shaft and the end face plate are complicated in shape, and there is room for improvement.

The invention is to provide a rotary electric machine and a driving system which can efficiently cool a permanent magnet with a simple configuration.

Means for Solving the Problem

In order to achieve the above object, according to an invention of aspect 1, there is a rotary electric machine (for example, a rotary electric machine 10 in an embodiment) including:

a rotor (for example, a rotor 20 in an embodiment) which includes a rotor core (for example, a rotor core 21 in an embodiment) and a plurality of permanent magnets (for example, permanent magnets 22 in an embodiment) disposed in the rotor core;

a stator (for example, a stator 30 in an embodiment) which includes a stator core (for example, a stator core 31 in an embodiment) and a coil (for example, a coil 32 in an embodiment) disposed in the stator core, and is disposed on an outer peripheral side of the rotor to face the rotor, and a case (for example, a case 50 in an embodiment) which accommodates the rotor and the stator, and includes a storage portion (for example, a storage portion 51 in an embodiment) for storing liquid therein, wherein a part of the rotor is immersed in the storage portion, and the case is provided with a liquid guiding portion (for example, an inclined wall 54 in an embodiment) which extends from an upper side toward the permanent magnet or a peripheral part of the permanent magnet, and guides liquid scraped upward by the rotor to the permanent magnet or the peripheral part.

According to an invention of aspect 2, in the invention of aspect 1, the liquid guiding portion overlaps with a coil end portion (for example, a coil end portion 32a in an embodiment), which protrudes from one axial end face (for example, a right end face in an embodiment) of the stator core, in an axial direction.

According to an invention of aspect 3, in the invention of aspect 1, the rotor core is formed with an internal flow passage (for example, an internal flow passage 21c in an embodiment) which penetrates through in an axial direction, on an inner peripheral side of the permanent magnet.

According to an invention of aspect 4, in the invention of aspect 3, the rotary electric machine includes a first end face plate (for example, a right end face plate 23R in an embodiment) which is disposed on one end side of the rotor core and a second end face plate (for example, a left end face plate 23L in an embodiment) which is disposed on the other end side of the rotor core, the first end face plate includes a liquid introduction portion (for example, a liquid introduction portion 24 in an embodiment) which faces the liquid guiding portion and communicates with the internal flow passage, the second end face plate includes a liquid discharge portion (for example, a liquid discharge portion 25 in an embodiment) which communicates with the internal flow passage, and the liquid discharge portion is positioned radially outside of the liquid introduction portion.

According to an invention of aspect 5, in the invention of aspect 4, the first end face plate and the second end face plate respectively include a shaft hole (for example, a shaft insertion hole 23e in an embodiment) through which a rotor shaft rotating integrally with the rotor core penetrates, and a plurality of through-holes (for example, through-holes 23f in an embodiment) which are provided at vertexes and midpoints of respective sides of a virtual square where diagonal lines intersect with each other at a center of the shaft hole, in the first end face plate, the through-holes provided at the midpoints of respective sides of the virtual square serve as the liquid introduction portion, and in the second end face plate, the through-holes provided at the vertexes of the virtual square serve as the liquid discharge portion.

According to an invention of aspect 6, in the invention of aspect 4, the coil includes a first coil end portion (for example, a coil end portion 32a in an embodiment) which protrudes from one axial end face (for example, the right end face in an embodiment) of the stator core and a second coil end portion (for example, a coil end portion 32a in an embodiment) which protrudes from the other axial end face (for example, a left end face in an embodiment) of the stator core, the first end face plate and the first coil end portion overlap with each other in the axial direction, and the second end face plate and the second coil end portion overlap with each other in the axial direction.

According to an invention of aspect 7, there is a driving system (for example, a driving system 60 in an embodiment) including:

a rotary electric machine (for example, a rotary electric machine 11 in an embodiment) including a rotor (for example, a rotor 20 in an embodiment) and a stator (for example, a stator 30 in an embodiment), wherein the rotor includes a rotor core (for example, a rotor core 21 in an embodiment) and a plurality of permanent magnets (for example, permanent magnets 22 in an embodiment) disposed in the rotor core, the stator includes a stator core (for example, a stator core 31 in an embodiment) and a coil (for example, a coil 32 in an embodiment) disposed in the stator core, and the stator is disposed on an outer peripheral side of the rotor to face the rotor;

a rotating body (for example, a gear 14 in an embodiment) which is disposed adjacent to the rotary electric machine; and a case (for example, a transmission case 61 in an embodiment) which accommodates the rotary electric machine and the rotating body, and includes a storage portion (for example, a storage portion 51 in an embodiment) for storing liquid therein, wherein a part of the rotating body is immersed in the storage portion or a rotational locus of the rotating body passes through the storage portion, and the case is provided with a liquid guiding portion (for example, an inclined wall 54 in an embodiment) which extends from an upper side toward the permanent magnet or a peripheral part of the permanent magnet, and guides liquid scraped upward by the rotating body to the permanent magnet or the peripheral part.

According to an invention of aspect 8, in the invention of aspect 7, the rotor core is formed with an internal flow passage (for example, an internal flow passage 21c in an embodiment) which penetrates through in an axial direction, on an inner peripheral side of the permanent magnet.

According to an invention of aspect 9, in the invention of aspect 8, the rotary electric machine includes a first end face plate (for example, a right end face plate 23R in an embodiment) which is disposed on one end side of the rotor core and a second end face plate (for example, a left end face plate 23L in an embodiment) which is disposed on the other end side of the rotor core, the first end face plate includes a liquid introduction portion (for example, a liquid introduction portion 24 in an embodiment) which faces the liquid guiding portion and communicates with the internal flow passage, the second end face plate includes a liquid discharge portion (for example, a liquid discharge portion 25 in an embodiment) which communicates with the internal flow passage, and the liquid discharge portion is positioned radially outside of the liquid introduction portion.

According to an invention of aspect 10, in the invention of aspect 9, the first end face plate and the second end face plate respectively include a shaft hole (for example, a shaft insertion hole 23e in an embodiment), through which a rotor shaft rotating integrally with the rotor core penetrates, and a plurality of through-holes (for example, through-holes 23f in an embodiment) which are provided at vertexes and midpoints of respective sides of a virtual square where diagonal lines intersect with each other at a center of the shaft hole, in the first end face plate, the through-holes provided at the midpoints of respective sides of the virtual square serve as the liquid introduction portion, and in the second end face plate, the through-holes provided at the vertexes of the virtual square serve as the liquid discharge portion.

According to an invention of aspect 11, in the invention of aspect 9, the coil includes a first coil end portion (for example, a coil end portion 32a in an embodiment) which protrudes from one axial end face (for example, a right end face in an embodiment) of the stator core and a second coil end portion (for example, a coil end portion 32a in an embodiment) which protrudes from the other axial end face of the stator core, the first end face plate and the first coil end portion overlap with each other in the axial direction, and the second end face plate and the second coil end portion overlap with each other in the axial direction.

Advantage of the Invention

According to the invention of aspect 1, the case is provided with the liquid guiding portion extending from the upper side toward the permanent magnet or the peripheral part of the permanent magnet, so that the liquid scraped upward by the rotor is guided to the permanent magnet or the peripheral part of the permanent magnet by the liquid guiding portion. Thus, the permanent magnet can be cooled without using a driving force of an oil pump or the like, or without forming a refrigerant passage in the rotor shaft.

According to the invention of aspect 2, since the liquid guiding portion overlaps with the coil end portion protruding from one axial end face of the stator core in the axial direction, it is possible to guide the liquid, which is scraped upward by the rotor, supplied to the coil, and falls from the coil end portion, to the permanent magnet.

According to the invention of aspect 3, since the rotor core is formed with the internal flow passage which penetrates through in the axial direction, on the inner peripheral side of the permanent magnet, the permanent magnet can be cooled over the entire region in the axis direction.

According to the invention of aspect 4, since the liquid discharge portion formed on the second end face plate is positioned radially outside of the liquid introduction portion formed on the first end face plate to face the liquid guiding portion, the liquid flowing along the liquid guiding portion flows from the first end face plate to the second end face plate through the rotor core in a direction from a radially inner side to a radially outer side. Therefore, it is possible to smoothly flow the liquid without going against the centrifugal force.

According to the invention of aspect 5, in the first end face plate, the through-holes provided at the midpoints of respective sides of the virtual square where diagonal lines intersect with each other at the center of the shaft hole serve as the liquid introduction portion, and in the second end face plate, the through-holes provided at the vertexes of the virtual square serve as the liquid discharge portion. Thus, the liquid discharge portion can be positioned radially outside of the liquid introduction portion while using the first end face plate and the second end face plate in common.

According to the invention of aspect 6, since the first end face plate and the first coil end portion overlap with each other in the axial direction, liquid not entering into the liquid introduction portion formed on the first end face plate is supplied to the first coil end portion. Moreover, since the second end face plate and the second coil end portion overlap with each other in the axial direction, the liquid discharged from the liquid discharge portion formed on the second end face plate is supplied to the second coil end portion. Therefore, the coil end portions on both sides of the coil are cooled, and thus the coil can be cooled evenly.

According to the invention of aspect 7, the case is provided with the liquid guiding portion extending from the upper side toward the permanent magnet or the peripheral part of the permanent magnet, so that the liquid scraped upward by the rotating body is guided to the permanent magnet or the peripheral part of the permanent magnet by the liquid guiding portion. Thus, the permanent magnet can be cooled without using a driving force of an oil pump or the like, or without forming a refrigerant passage in the rotor shaft.

According to the invention of aspect 8, since the rotor core is formed with the internal flow passage which penetrates through in the axial direction, on the inner peripheral side of the permanent magnet, the permanent magnet can be cooled over the entire region in the axis direction.

According to the invention of aspect 9, since the liquid discharge portion formed on the second end face plate is positioned radially outside of the liquid introduction portion formed on the first end face plate to face the liquid guiding portion, the liquid flowing along the liquid guiding portion flows from the first end face plate to the second end face plate through the rotor core in a direction from a radially inner side to a radially outer side. Therefore, it is possible to smoothly flow the liquid without going against the centrifugal force.

According to the invention of aspect 10, in the first end face plate, the through-holes provided at the midpoints of respective sides of the virtual square where diagonal lines intersect with each other at the center of the shaft hole serve as the liquid introduction portion, and in the second end face plate, the through-holes provided at the vertexes of the virtual square serve as the liquid discharge portion. Thus, the liquid discharge portion can be positioned radially outside of the liquid introduction portion while using the first end face plate and the second end face plate in common.

According to the invention of aspect 11, since the first end face plate and the first coil end portion overlap with each other in the axial direction, liquid not entering into the liquid introduction portion formed on the first end face plate is supplied to the first coil end portion. Moreover, since the second end face plate and the second coil end portion overlap with each other in the axial direction, the liquid discharged from the liquid discharge portion formed on the second end face plate is supplied to the second coil end portion. Therefore, the coil end portions on both sides of the coil are cooled, and thus the coil can be cooled evenly.

MODE FOR CARRYING OUT THE INVENTION

Embodiments of the invention will be described below with reference to the drawings. The drawings are seen in a direction in which reference numerals given herein look normally. First, a rotary electric machine 10 will be described as a first embodiment of the invention, and then a driving system 60 will be described as a second embodiment of the invention.

First Embodiment

Figure 1:
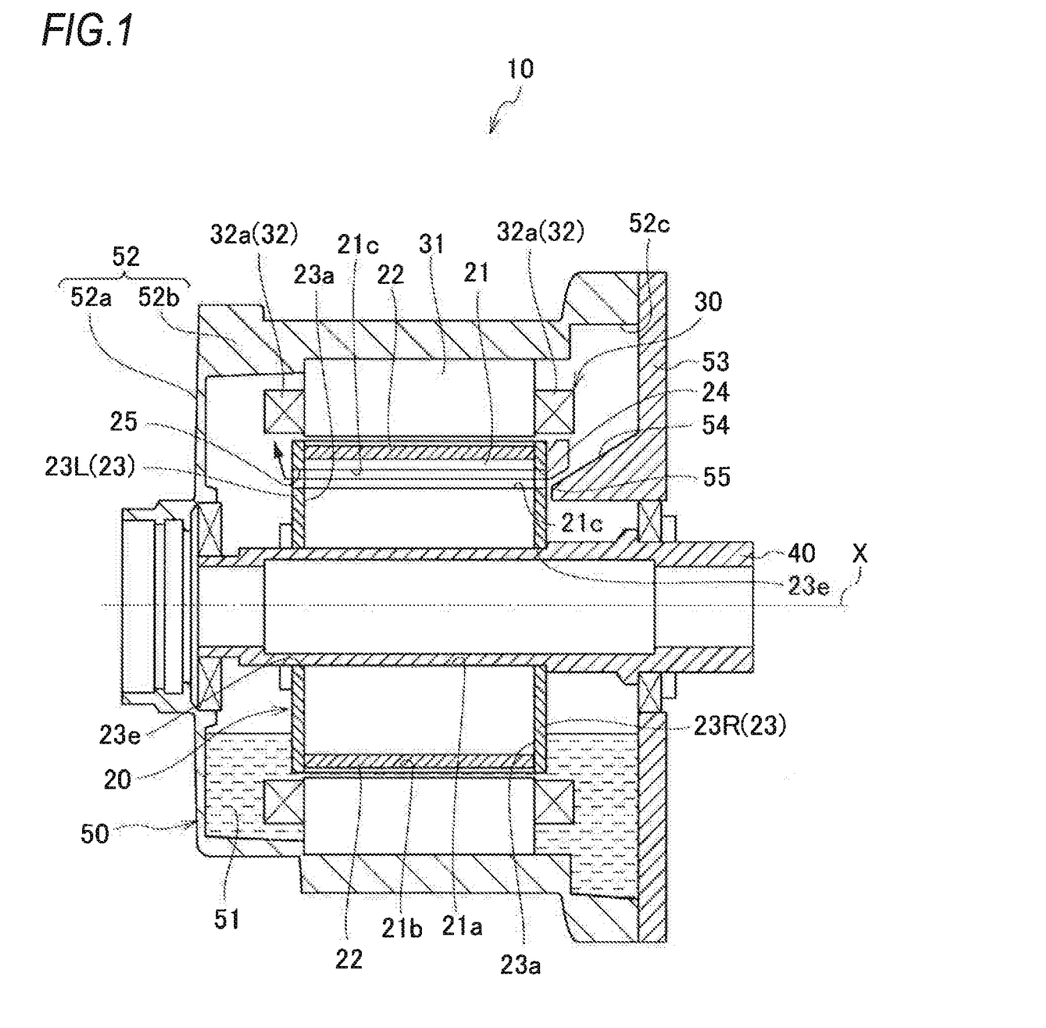
FIG. 1 is a cross-sectional view of a rotary electric machine according to a first embodiment of the invention.

[Rotary Electric Machine]
As illustrated in FIG. 1, a rotary electric machine 10 according to the embodiment is a so-called inner-rotor type rotary electric machine including a rotor 20, a stator 30 that is disposed on an outer periphery side of the rotor 20 to face with a slight gap therebetween, a rotor shaft 40 attached to an inner periphery of the rotor 20 so as to rotate integrally with the rotor 20, and a motor case 50 that accommodates the rotor 20 and the stator 30 and rotatably supports the rotor shaft 40.

[Case]
The motor case 50 includes a case body 52 in which a cylindrical portion 52b extends axially from an outer edge of an annular bottom wall 52a (left wall) and a case cover 53 (right wall) which covers an opening 52c of the case body 52, and the stator 30 is fixed to the cylindrical portion 52b. The motor case 50 is provided with a storage portion 51, which stores liquid (for example, lubricating oil), at a lower part thereof.

[Stator]
The stator 30 includes a stator core 31 and a coil 32 wound around the stator core 31. The stator core 31 is formed by laminating a plurality of press-punched steel sheets in an axial direction. A plurality of teeth are formed on the inner periphery of the stator core 31, and a plurality of slots partitioned and formed between the adjacent teeth penetrate through the stator core 31 in the axial direction and are disposed at equal intervals in a circumferential direction.

The coil 32 is wound around each of the teeth, and coil end portions 32a protrude from both axial end faces of the stator core 31. Since the coil 32 generates heat when the rotary electric machine 10 is driven to rotate, it is preferable to cool the coil 32 in order to avoid performance degradation and deterioration in components due to heat generation.

Figure 2:
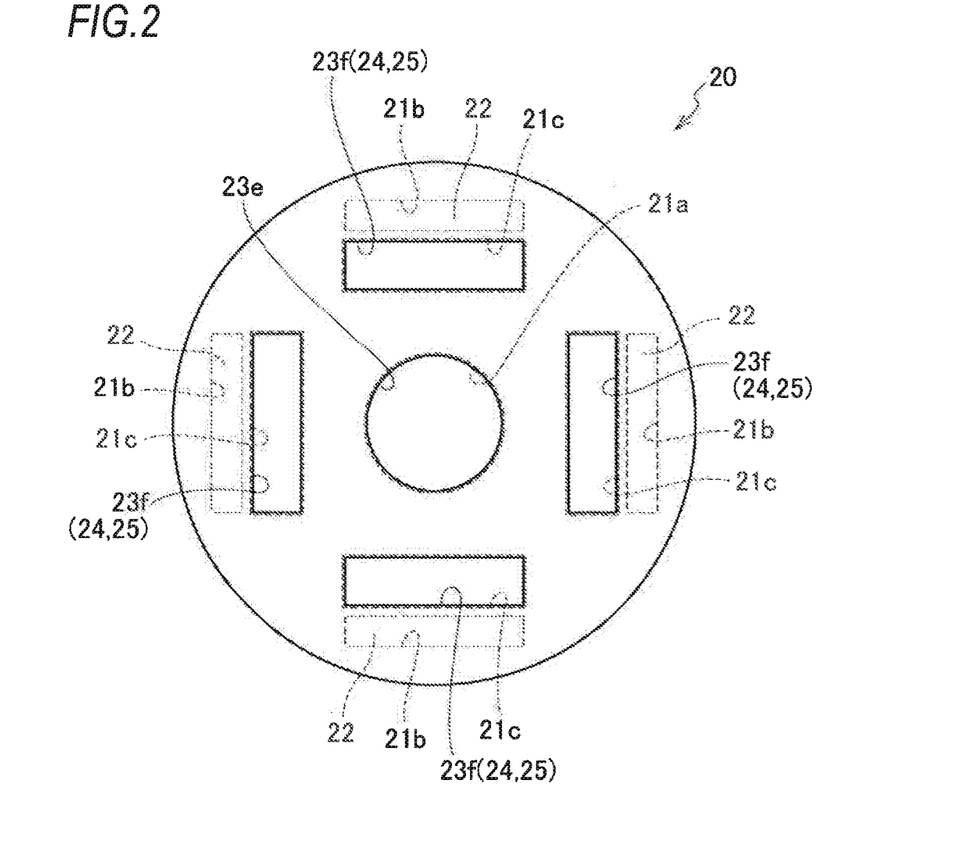
FIG. 2 is a side view of a rotor of the rotary electric machine illustrated in FIG. 1.

[Rotor]
The rotor 20 includes a rotor core 21, a plurality of permanent magnets 22 disposed in the rotor core 21, and a pair of end face plates 23 fixed to both end faces of the rotor core 21. The rotor core 21 is made up of a plurality of steel sheets laminated in the axial direction. A shaft insertion hole 21a is formed at the center of the rotor core 21 to penetrate through the rotor core 21 in the axial direction, and a plurality of magnet accommodating holes 21b are formed at the outer periphery of the rotor core 21 to penetrate through the rotor core 21 in the axial direction. Referring to FIG. 2, in this embodiment of the invention, four magnet accommodating holes 21b are formed at equal intervals (90° intervals) in the circumferential direction. In addition, four rectangular internal flow passages 21c are formed at equal intervals (90° intervals) in the circumferential direction of the rotor core 21 between the shaft insertion hole 21a and the magnet accommodating hole 21b in a radial direction to penetrate through the rotor core 21 in the axial direction.

The permanent magnet 22 is configured using a rare earth magnet, and is attached to the magnet accommodating hole 21b of the rotor core 21. Since the permanent magnet 22 generates heat when the rotary electric machine 10 is driven to rotate, it is necessary to cool the permanent magnet 22 in order to avoid performance degradation and deterioration in components due to heat generation.

The lower part of the rotor 20 is rotatably supported by the rotor shaft 40 in a state of being immersed in the storage portion 51 provided in the motor case 50. Therefore, any one of the plurality of permanent magnets 22 attached to the magnet accommodating hole 21b of the rotor core 21 is immersed in the storage portion 51 even when the rotary electric machine 10 is driven to rotate.

[Inclined Wall]

On the case cover 53, an inclined wall 54 is provided above an axial center X of the rotor shaft 40 to be inclined from the outside to the inside in the radial direction as approaching the rotor 20 in the axial direction. The inclined wall 54 extends toward the rotor 20 to overlap with the right coil end portion 32a in the axial direction, and a tip end portion 55 is disposed so as to close to a peripheral part of the permanent magnet 22, that is, the opening of the internal flow passage 21c positioned on the inner peripheral side. That is, the inclined wall 54 is provided to extend from the upper side toward the peripheral part of the permanent magnet 22.

[End Face Plate]

The end face plates 23 (hereinafter, the left end face plate is referred to as a left end face plate 23L and the right end face plate is referred to as a right end face plate 23R in some cases) fixed to both end faces of the rotor core 21 have an annular shape having the same shape as the steel sheet constituting the rotor core 21, and an inside surface 23a thereof contacts with the end face of the rotor core 21 to prevent the permanent magnet 22 fixed to the magnet accommodating hole 21b from coming off.

The end face plate 23 is disposed to overlap with the coil end portion 32a in the axial direction. That is, the left end face plate 23L overlaps with the coil end portion 32a, which protrudes from the left end face of the rotor core 21, in the axial direction, and the right end face plate 23R overlaps with the coil end portion 32a, which protrudes from the right end face of the rotor core 21, in the axial direction.

As illustrated in FIG. 2, a shaft insertion hole 23e is formed at the center of the end face plate 23 to penetrate through the end face plate 23 in the axial direction, and a through-hole 23f communicating with the internal flow passage 21c formed in the rotor core 21 and having substantially the same shape as the internal flow passage 21c is formed on the outside of the shaft insertion hole 23e. The through-hole 23f of the right end face plate 23R is a liquid introduction portion 24 which faces the tip end portion 55 of the inclined wall 54 and introduces liquid flowing along the inclined wall 54 into the internal flow passage 21c, and the through-hole 23f of the left end face plate 23L is a liquid discharge portion 25 which discharges liquid flowing in the internal flow passage 21c.

[Operation]

A cooling operation of the rotary electric machine 10 having the above-described configuration will be described below.

Since the lower part of the rotor 20 is immersed in the storage portion 51 provided in the motor case 50 when the rotor 20 rotates, the permanent magnet 22 immersed in the storage portion 51 is cooled via the outer peripheral surface of the rotor core 21 and the end face plate 23 during the rotation of the rotor 20. In addition, since the lower part of the stator 30 positioned on the lower outer peripheral side of the rotor 20 is always immersed in the storage portion 51, the coil 32 immersed in the liquid is also constantly cooled.

On the other hand, the coil 32 positioned above the liquid level of the storage portion 51 is exposed from the storage portion 51 and thus tends to become hot, but the liquid accumulated in the storage portion 51 is scraped upward by the rotation of the rotor 20 and is supplied to the coil 32, whereby the coil 32 is cooled. In addition, some of the liquid scattered to the coil end portion 32a of the coil 32 falls due to gravity, but the inclined wall 54 is provided below the right coil end portion 32a. Thus, the liquid falling from the right coil end portion 32a is guided to the liquid introduction portion 24, which is formed on the right end face plate 23R, by the inclined wall 54, and is introduced into the internal flow passage 21c of the rotor core 21 from the liquid introduction portion 24.

Therefore, the permanent magnet 22 exposed from the storage portion 51 during the rotation of the rotor 20 is also cooled in the entire axial direction by the liquid flowing through the internal flow passage 21c of the rotor core 21. The liquid flowing through the internal flow passage 21c is discharged from the liquid discharge portion 25 formed on the left end face plate 23L to the outside of the rotor core 21. However, since the left coil end portion 32a is positioned above the left end face plate 23L, the liquid discharged from the liquid discharge portion 25 is scattered by the centrifugal force due to the rotation of the rotor 20, and is supplied to the left coil end portion 32a.

On the other hand, the liquid which is guided toward the liquid introduction portion 24 by the inclined wall 54 but is not introduced to the internal flow passage 21c of the rotor core 21 from the liquid introduction portion 24 is repelled by the right end face plate 23R and is scattered to the right coil end portion 32a, which is positioned above the right end face plate 23R, by the centrifugal force.

As described above, according to this embodiment, the motor case 50 is provided with the inclined wall 54 extending from the upper side toward the peripheral part of the permanent magnet 22, so that the liquid scraped upward by the rotor 20 is guided to the peripheral part of the permanent magnet 22 by the inclined wall 54. Thus, the permanent magnet 22 can be cooled without using a driving force of an oil pump or the like, or without forming a refrigerant passage in the rotor shaft 40.

Further, since the inclined wall 54 overlaps with the coil end portion 32a protruding from the right end face of the stator core 31 in the axial direction, it is possible to guide the liquid, which is scraped upward by the rotor 20, supplied to the coil 32, and falls from the coil end portion 32a, to the permanent magnet 22.

In addition, since the rotor core 21 is formed with the internal flow passage 21c which penetrates through in the axial direction, on the inner peripheral side of the permanent magnet 22, the permanent magnet 22 can be cooled over the entire region in the axis direction.

Since the right end face plate 23R and the right coil end portion 32a overlap with each other in the axial direction, liquid not entering into the liquid introduction portion 24 formed on the right end face plate 23R is supplied to the right coil end portion 32a. Moreover, since the left end face plate 23L and the right coil end portion 32a overlap with each other in the axial direction, the liquid discharged from the liquid discharge portion 25 formed on the left end face plate 23L is supplied to the left coil end portion 32a. Therefore, the coil end portions 32a on both sides of the coil 32 are cooled, and thus the coil 32 can be cooled evenly.

Subsequently, rotary electric machines 10 according to modified examples of this embodiment will be described.

First Modified Example

Figure 3A:
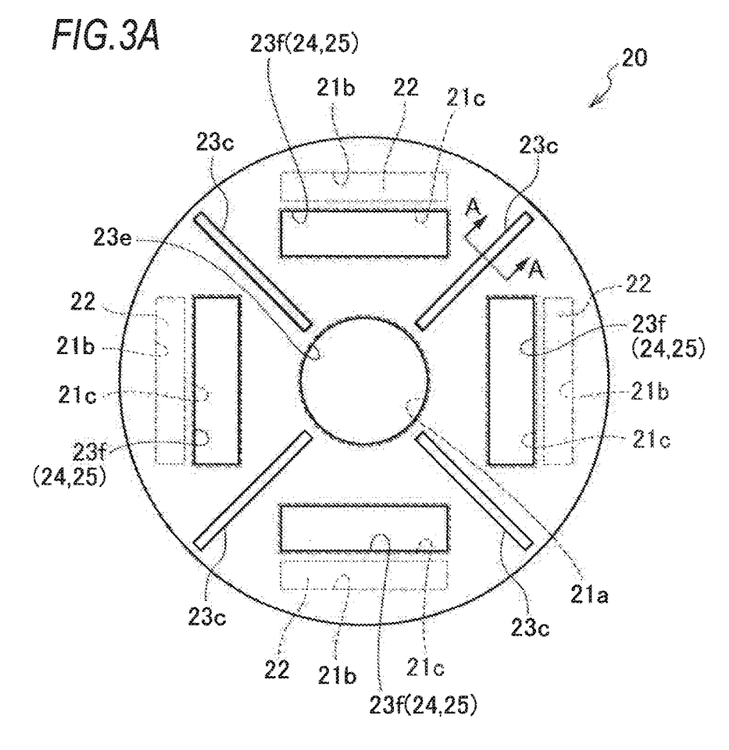
FIG. 3A is a side view of a rotor according to a first modified example.
Figure 3B:
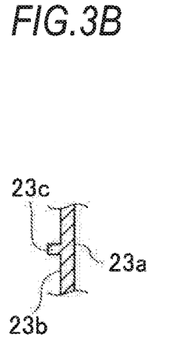
FIG. 3B is a cross-sectional view taken along line A-A in FIG. 3A.

In a rotary electric machine 10 according to a first modified example, as illustrated in FIGS. 3A and 3B, a plurality of protruding portions 23c are provided on the outside surface 23b of the end face plate 23 according to the above-described embodiment so as to extend in the radial direction at equal intervals in the circumferential direction. The plurality of protruding portions 23c are provided on the outside surface 23b of the end face plate 23, and thus the end face plate 23 also rotates due to the rotation of the rotor 20 and the liquid lifted by the protruding portion 23c is scattered by the centrifugal force due to the rotation of the rotor 20, so that the amount of liquid to be scattered to the coil 32 can be increased.

Second Modified Example

Figure 4A:
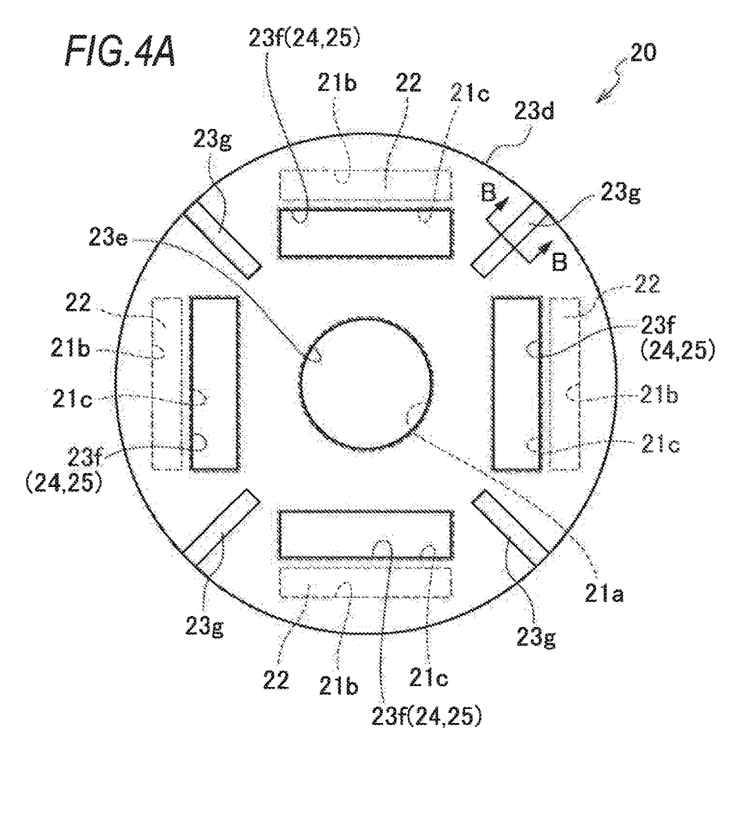
FIG. 4A is a side view of a rotor according to a second modified example.
Figure 4B:
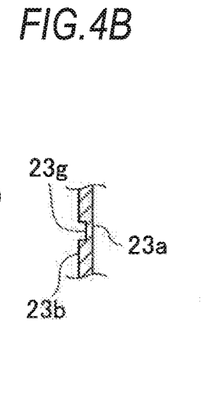
FIG. 4B is a cross-sectional view taken along line B-B in FIG. 4A.

In a rotary electric machine 10 according to a second modified example, as illustrated in FIGS. 4A and 4B, a plurality of recessed grooves 23g are provided at equal intervals in the circumferential direction in the outside surface 23b of the end face plate 23 according to the above-described embodiment to radially extend inward from the outer peripheral surface 23d. The plurality of recessed grooves 23g are provided in the outside surface 23b of the end face plate 23, and thus the end face plate 23 also rotates due to the rotation of the rotor 20 and the liquid accumulated in the recessed grooves 23g is scattered by the centrifugal force due to the rotation of the rotor 20, so that the amount of liquid to be scattered to the coil 32 can be increased.

Instead of the recessed groove 23g, a liquid guide hole may be provided in the end face plate 23 to penetrate through the inside surface 23a and the outside surface 23b. The end face plate 23 is fixed to the end face of the rotor core 21, and thus a recessed groove is formed by the outside surface of the rotor core 21 and the liquid guide hole of the end face plate 23. Thus, the amount of liquid to be scattered to the coil 32 can also be increased.

Third Modified Example

Figure 5A:
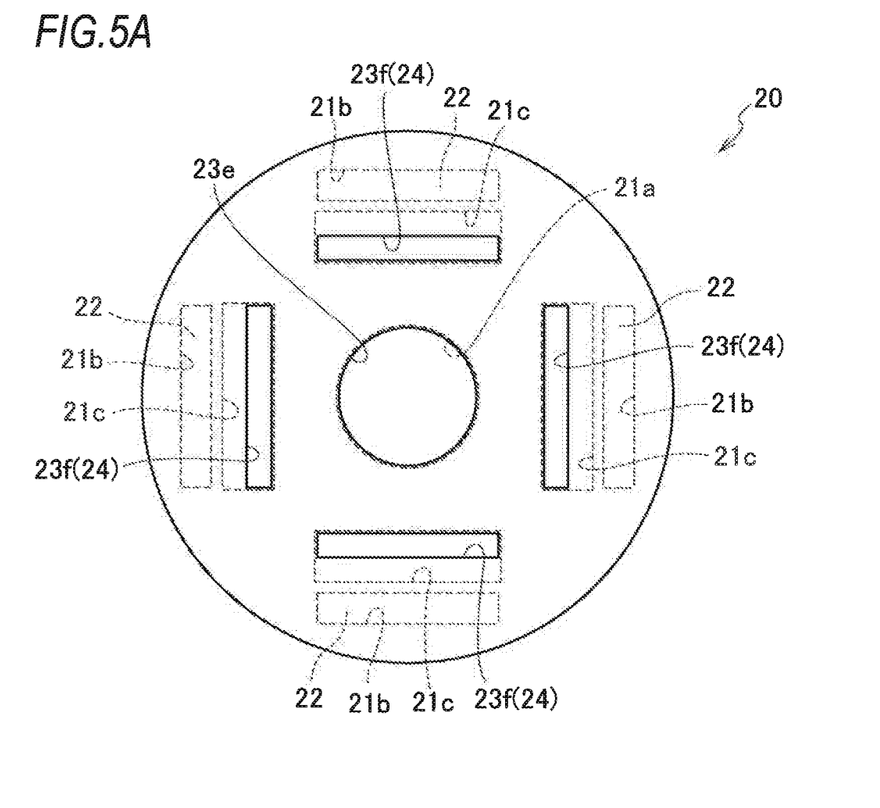
FIG. 5A is a left side view of a rotor according to a third modified example.
Figure 5B:
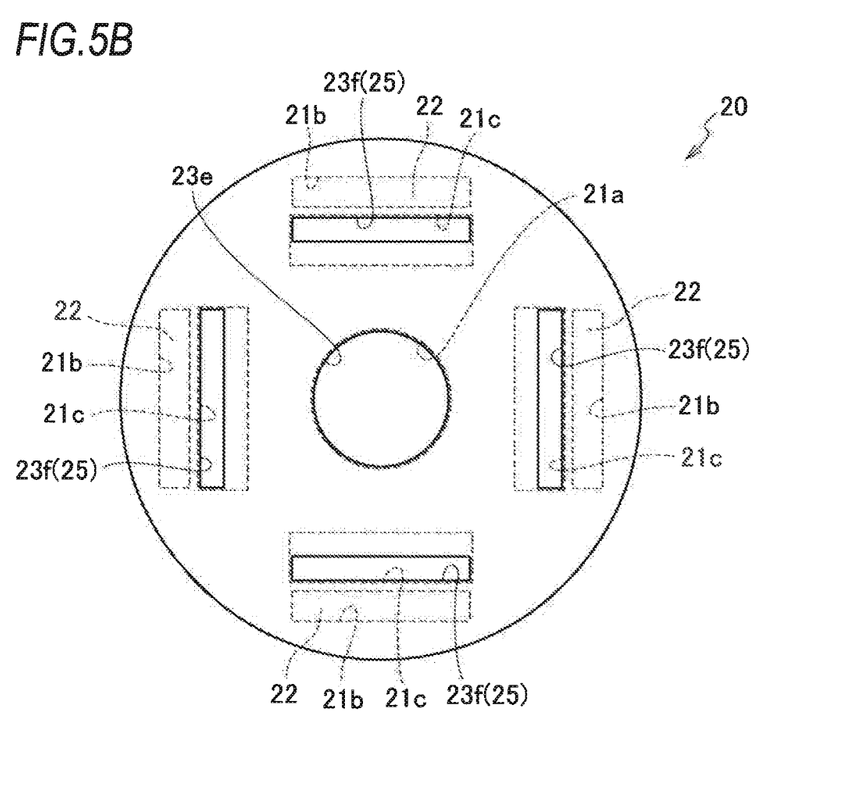
FIG. 5B is a right side view thereof.

In a rotary electric machine 10 according to a third modified example, the liquid introduction portion 24 formed on the right end face plate 23R is formed only in a lower half of the internal flow passage 21c as illustrated in FIG. 5B, the liquid discharge portion 25 formed on the left end face plate 23L is formed only in an upper half of the internal flow passage 21c as illustrated in FIG. 5A, the liquid introduction portion 24 and the liquid discharge portion 25 are different from each other, and the liquid discharge portion 25 is positioned radially outside of the liquid introduction portion 24.

In this way, since the liquid discharge portion 25 formed on the left end face plate 23L is positioned radially outside of the liquid introduction portion 24 formed on the right end face plate 23R to face the inclined wall 54, the liquid flowing along the inclined wall 54 flows from the right end face plate 23R to the left end face plate 23L through the rotor core 21 in a direction from a radially inner side to a radially outer side. Therefore, it is possible to smoothly flow the liquid without going against the centrifugal force.

Fourth Modified Example

Figure 6A:
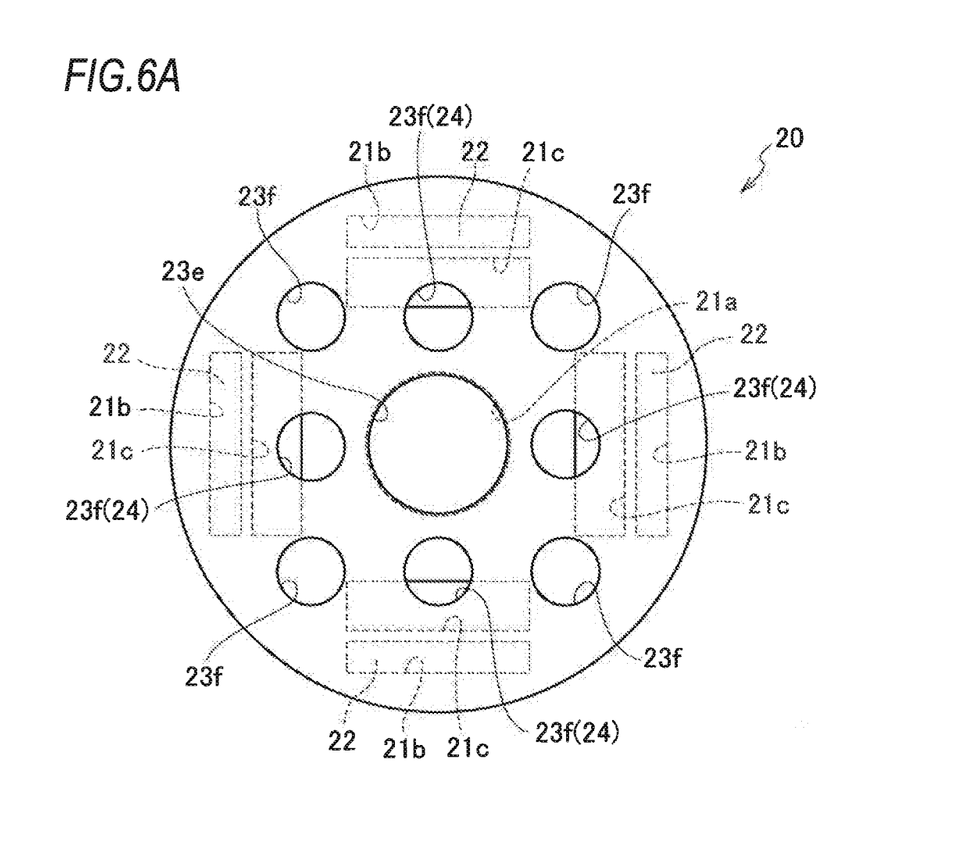
FIG. 6A is a left side view of a rotor according to a fourth modified example.
Figure 6B:
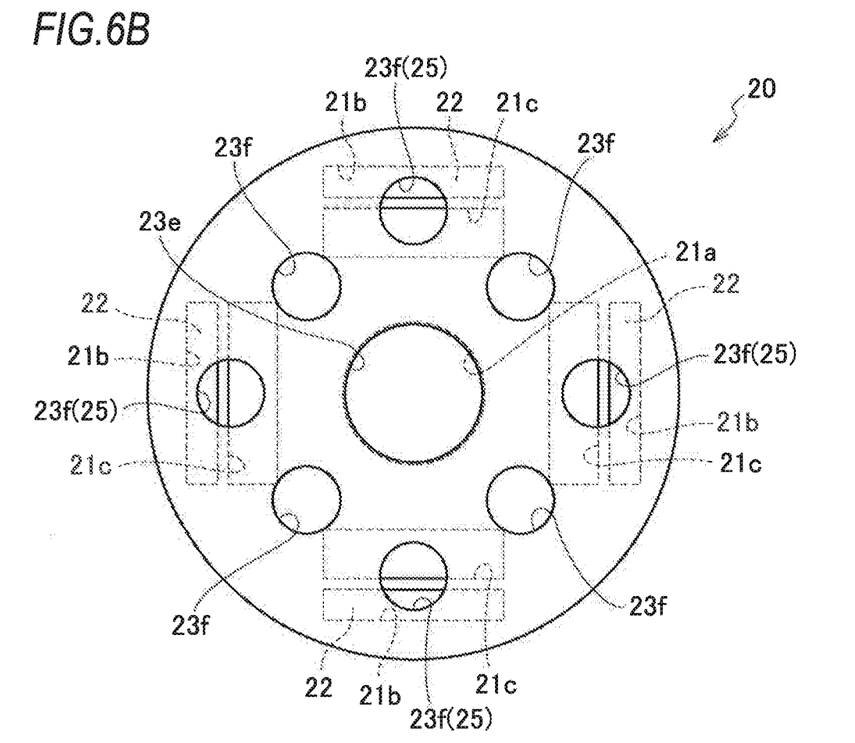
FIG. 6B is a right side view thereof.

In a rotary electric machine 10 according to a fourth modified example, as illustrated in FIGS. 6A and 6B, eight through-holes 23f are provided at vertexes and midpoints of respective sides of a virtual squares where diagonal lines intersect with each other at the center of the shaft insertion hole 23e in the end face plate 23.

In the right end face plate 23R, as illustrated in FIG. 6B, the through-holes 23f provided at the midpoints of respective sides of the virtual squares where the diagonal lines intersect with each other at the center of the shaft insertion hole 23e mainly serve as liquid introduction portions 24. In the left end face plate 23L, as illustrated in FIG. 6A, the right end face plate 23R and the left end face plate 23L are rotated by 45° such that the through-holes 23f provided at the vertexes of the virtual square mainly serve as liquid discharge portions 25. This allows the liquid discharge portion 25 to be positioned radially outside of the liquid introduction portion 24 while using the right end face plate 23R and the left end face plate 23L in common.

Second Embodiment

Subsequently, a driving system 60 according to a second embodiment of the invention will be described.

[Driving System]

Figure 7:
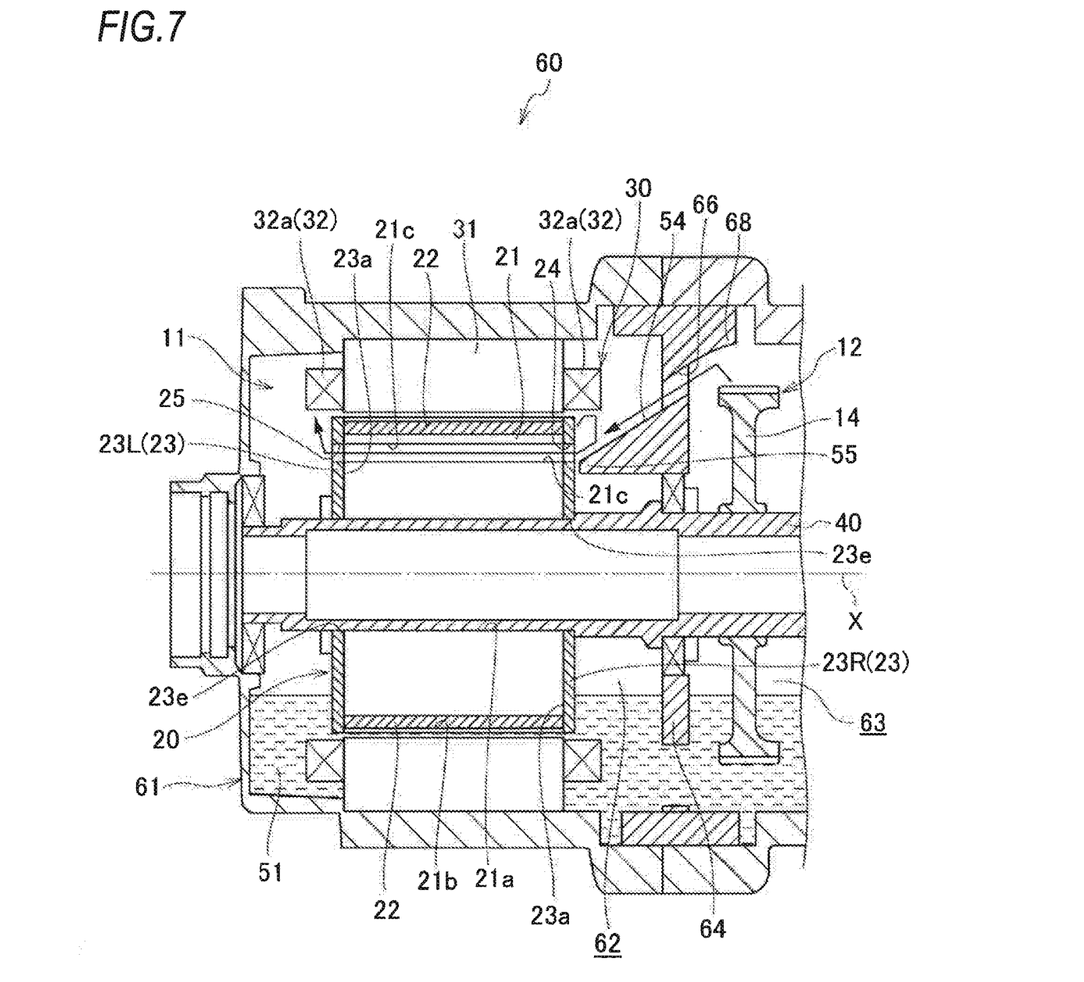
FIG. 7 is a cross-sectional view of a driving system according to a second embodiment of the invention.

In the driving system 60 according to this embodiment, as illustrated in FIG. 7, a rotary electric machine 11 and a transmission 12 are incorporated in a transmission case 61, and the rotary electric machine 11 includes a rotor 20, a stator 30 that is disposed on an outer peripheral side of the rotor 20 to face with a slight gap therebetween, and a rotor shaft 40 attached to an inner periphery of the rotor 20 so as to rotate integrally with the rotor 20. Since the rotor 20, the stator 30, the rotor shaft 40, and the end face plate 23 are the same as those in the first embodiment, a detailed description thereof will not be presented.

[Case]

In a transmission case 61, a rotary electric machine accommodating portion 62 and a transmission accommodating portion 63 are partitioned by an intermediate wall 64, and a lower part of the transmission case 61 is provided with a storage portion 51.

A gear 14 is attached to the rotor shaft 40 so as to be rotatable integrally with the rotor shaft to close to the intermediate wall 64 in the transmission accommodating portion 63. A lower part of the gear 14 is supported by the rotor shaft 40 in a state of being immersed in the storage portion 51 provided in the transmission case 61.

[Inclined Wall]

On the intermediate wall 64, an inclined wall 54 is provided above an axial center X of the rotor shaft 40 to be radially inclined from the outside to the inside as approaching the rotor 20 in an axial direction. The inclined wall 54 extends toward the rotor 20 to overlap with a right coil end portion 32a in the axial direction, and a tip end portion 55 is disposed so as to close to a peripheral part of a permanent magnet 22, that is, an opening of an internal flow passage 21c positioned on the inner peripheral side. That is, the inclined wall 54 is provided to extend from the upper side toward the peripheral part of the permanent magnet 22.

In addition, a communication hole 66 penetrating through the rotary electric machine accommodating portion 62 and the transmission accommodating portion 63 is provided on the intermediate wall 64 so as to be continuous with the inclined wall 54.

[Operation]

A cooling operation of the driving system 60 having the above-described configuration will be described below.

Since the lower part of the rotor 20 is immersed in the storage portion 51 provided in the transmission case 61 when the rotor 20 rotates, the permanent magnet 22 immersed in the storage portion 51 is cooled via the outer peripheral surface of the rotor core 21 and the end face plate 23 during the rotation of the rotor 20. In addition, since the lower part of the stator 30 positioned on the lower outer peripheral side of the rotor 20 is always immersed in the storage portion 51, the coil 32 immersed in the liquid is also constantly cooled.

On the other hand, the coil 32 positioned above the liquid level of the storage portion 51 is exposed from the storage portion 51 and thus tends to become hot, but the liquid accumulated in the storage portion 51 is scraped upward by the rotation of the rotor 20 and is supplied to the coil 32, whereby the coil 32 is cooled. In addition, some of the liquid scattered to the coil end portion 32a of the coil 32 falls due to gravity, but the inclined wall 54 is provided below the right coil end portion 32a.

Furthermore, since the gear 14 attached to the rotor shaft 40 also rotates as the rotor 20 rotates, the liquid stored in the storage portion 51 is scraped upward by the rotation of the gear 14, and some of the scattered liquid flows through the inclined wall 54 through the communication hole 66. A liquid guide 68 is preferably formed on the communication hole 66 provided on the intermediate wall 64 to actively guide the liquid scattered by the rotation of the gear 14 to the communication hole 66. Thus, the liquid falling from a right coil end portion 32a and the liquid scattered by the rotation of the gear 14 and passing through the communication hole 66 are guided by the inclined wall 54 toward a liquid introduction portion 24 formed on a right end face plate 23R, and are introduced into the internal flow passage 21c of the rotor core 21 from the liquid introduction portion 24.

Therefore, the permanent magnet 22 exposed from the storage portion 51 during the rotation of the rotor 20 is also cooled in the entire axial direction by the liquid flowing through the internal flow passage 21c of the rotor core 21. The liquid flowing through the internal flow passage 21c is discharged from the liquid discharge portion 25 formed on the left end face plate 23L to the outside of the rotor core 21. However, since the left coil end portion 32a is positioned above the left end face plate 23L, the liquid discharged from the liquid discharge portion 25 is scattered by the centrifugal force due to the rotation of the rotor 20, and is supplied to the left coil end portion 32a.

On the other hand, the liquid which is guided toward the liquid introduction portion 24 by the inclined wall 54 but is not introduced to the internal flow passage 21c of the rotor core 21 from the liquid introduction portion 24 is repelled by the right end face plate 23R and is scattered to the right coil end portion 32a, which is positioned above the right end face plate 23R, by the centrifugal force.

As described above, according to this embodiment, the transmission case 61 is provided with the inclined wall 54 extending from the upper side toward the peripheral part of the permanent magnet 22, so that the liquid scraped upward by the gear 14 is guided to the permanent magnet 22 by the inclined wall 54. Thus, the permanent magnet 22 can be cooled without using a driving force of an oil pump or the like, or without forming a refrigerant passage in the rotor shaft 40.

Further, since the inclined wall 54 overlaps with the coil end portion 32a protruding from the right end face of the stator core 31 in the axial direction, it is possible to guide not only the liquid scraped upward by the gear 14 but also the liquid, which is scraped upward by the rotor 20, supplied to the coil 32, and falls from the coil end portion 32a, to the permanent magnet 22.

In addition, since the rotor core 21 is formed with the internal flow passage 21c penetrating through in the axial direction on the inner peripheral side of the permanent magnet 22, the permanent magnet 22 can be cooled over the entire region in the axis direction.

Since the right end face plate 23R and the right coil end portion 32a overlap with each other in the axial direction, liquid not entering into the liquid introduction portion 24 formed on the right end face plate 23R is supplied to the right coil end portion 32a. Moreover, since the left end face plate 23L and the right coil end portion 32a overlap with each other in the axial direction, the liquid discharged from the liquid discharge portion 25 formed on the left end face plate 23L is supplied to the left coil end portion 32a. Therefore, the coil end portions 32a on both sides of the coil 32 are cooled, and thus the coil 32 can be cooled evenly.

The first to fourth modified examples described above can also be applied to the driving system 60 according to this embodiment.

The invention is not limited to the above-described embodiment and may be appropriately changed or improved.

For example, the rotary electric machine according to the invention may be not only an electric motor but also a generator or a motor generator functioning as an electric motor and a generator.

In this embodiment, the inclined wall 54 integrally provided with the case cover 53 or the intermediate wall 64 is exemplified as the liquid introduction portion, but a member extending from the upper side toward the permanent magnet 22 or the peripheral part of the permanent magnet 22 may be attached to the motor case 50 (case cover 53) or the transmission case 61 (intermediate wall 64) to guide the liquid scraped upward by the rotor 20 or the liquid scraped upward by the gear 14 to the permanent magnet 22 or the peripheral part of the permanent magnet 22.

Further, as a rotating body, the gear 14 having the lower part immersed in the storage portion 51 may be used, or a planetary gear of a planetary gear mechanism having a revolution locus passing through the storage portion 51 may be used. In addition, another rotating body such as a shaft member may be used without being limited to the gear.

The rotary electric machine 10 and the driving system 60 may be sufficient as long as the liquid scraped upward by the rotor 20 or the gear 14 is guided to the permanent magnet 22 or the peripheral part of the permanent magnet 22 by the inclined wall 54. Therefore, the permanent magnet 22 is not necessary to be cooled from the inside of the rotor core 21 through the internal flow passage 21c, the permanent magnet 22 may be cooled through the end face plate 23, and the permanent magnet 22 may be directly cooled without using the end face plate 23.

DESCRIPTION OF REFERENCE NUMERALS AND CHARACTERS 10 rotary electric machine
11 rotary electric machine
14 gear (rotating body)
20 rotor
21 rotor core
21c internal flow passage
22 permanent magnet
23e shaft insertion hole
23f through-hole
23L left end face plate (second end face plate)
23R right end face plate (first end face plate)
24 liquid introduction portion
25 liquid discharge portion
30 stator
31 stator core
32 coil
32a coil end portion
50 motor case (case)
51 storage portion
54 inclined wall (liquid guiding portion)
60 driving system
61 transmission case (case).

The invention claimed is:

1. A rotary electric machine, comprising:
a rotor which includes a rotor core and a plurality of permanent magnets disposed in the rotor core;
a stator which includes a stator core and a coil disposed in the stator core, and is disposed on an outer peripheral side of the rotor to face the rotor; and
a case which accommodates the rotor and the stator, and includes a storage portion for storing liquid therein,
wherein a lower part of the rotor is immersed in the storage portion, and
the case is provided with a liquid guiding portion which extends from an upper side toward the permanent magnet or a peripheral part of the permanent magnet, and guides liquid scraped to an upper part of the rotor by the rotor to the permanent magnet or the peripheral part.

2. The rotary electric machine according to claim 1,
wherein the liquid guiding portion overlaps with a coil end portion, which protrudes from one axial end face of the stator core, in an axial direction.

3. The rotary electric machine according to claim 1,
wherein the rotor core is formed with an internal flow passage which penetrates through in an axial direction, on an inner peripheral side of the permanent magnet.

4. The rotary electric machine according to claim 3,
wherein the rotary electric machine includes a first end face plate which is disposed on one end side of the rotor core, and a second end face plate which is disposed on the other end side of the rotor core,
the first end face plate includes a liquid introduction portion which faces the liquid guiding portion and communicates with the internal flow passage,
the second end face plate includes a liquid discharge portion which communicates with the internal flow passage, and
the liquid discharge portion is positioned radially outside of the liquid introduction portion.

5. The rotary electric machine according to claim 4,
wherein the first end face plate and the second end face plate respectively include a shaft hole through which a rotor shaft rotating integrally with the rotor core penetrates, and a plurality of through-holes which are provided at vertexes and midpoints of respective sides of a virtual square where diagonal lines intersect with each other at a center of the shaft hole,
in the first end face plate, the through-holes provided at the midpoints of respective sides of the virtual square serve as the liquid introduction portion, and
in the second end face plate, the through-holes provided at the vertexes of the virtual square serve as the liquid discharge portion.

6. The rotary electric machine according to claim 4,
wherein the coil includes a first coil end portion which protrudes from one axial end face of the stator core, and a second coil end portion which protrudes from the other axial end face of the stator core,
the first end face plate and the first coil end portion overlap with each other in the axial direction, and
the second end face plate and the second coil end portion overlap with each other in the axial direction.

7. A driving system, comprising:
a rotary electric machine including a rotor and a stator, wherein the rotor includes a rotor core and a plurality of permanent magnets disposed in the rotor core, the stator includes a stator core and a coil disposed in the stator core, and the stator is disposed on an outer peripheral side of the rotor to face the rotor;
a rotating body which is disposed adjacent to the rotary electric machine; and
a case which accommodates the rotary electric machine and the rotating body, and includes a storage portion for storing liquid therein,
wherein a part of the rotating body is immersed in the storage portion, or a rotational locus of the rotating body passes through the storage portion, and
the case is provided with a liquid guiding portion which extends from an upper side toward the permanent magnet or a peripheral part of the permanent magnet, and guides liquid scraped to an upper part of the rotor by the rotating body to the permanent magnet or the peripheral part.

8. The driving system according to claim 7,
wherein the rotor core is formed with an internal flow passage which penetrates through in an axial direction, at an inner peripheral side of the permanent magnet.

9. The driving system according to claim 8,
wherein the rotary electric machine includes a first end face plate which is disposed on one end side of the rotor core, and a second end face plate which is disposed on the other end side of the rotor core,
the first end face plate includes a liquid introduction portion which faces the liquid guiding portion and communicates with the internal flow passage,
the second end face plate includes a liquid discharge portion which communicates with the internal flow passage, and
the liquid discharge portion is positioned radially outside of the liquid introduction portion.

10. The driving system according to claim 9,
wherein the first end face plate and the second end face plate respectively include a shaft hole, through which a rotor shaft rotating integrally with the rotor core penetrates, and a plurality of through-holes which are provided at vertexes and midpoints of respective sides of a virtual square where diagonal lines intersect with each other at a center of the shaft hole, in the first end face plate, the through-holes provided at the midpoints of respective sides of the virtual square serve as the liquid introduction portion, and in the second end face plate, the through-holes provided at the vertexes of the virtual square serve as the liquid discharge portion.

11. The driving system according to claim 9, wherein the coil includes a first coil end portion which protrudes from one axial end face of the stator core, and a second coil end portion which protrudes from the other axial end face of the stator core, the first end face plate and the first coil end portion overlap with each other in the axial direction, and the second end face plate and the second coil end portion overlap with each other in the axial direction.

* * * * *